Nov. 3, 1964   E. C. CRIPE   3,155,423
LIFTABLE VEHICLE TOP
Filed Oct. 30, 1962   2 Sheets-Sheet 1

INVENTOR.
EARNEST C. CRIPE
BY
Kimmel & Crowell
ATTORNEYS.

Nov. 3, 1964 E. C. CRIPE 3,155,423
LIFTABLE VEHICLE TOP
Filed Oct. 30, 1962 2 Sheets-Sheet 2
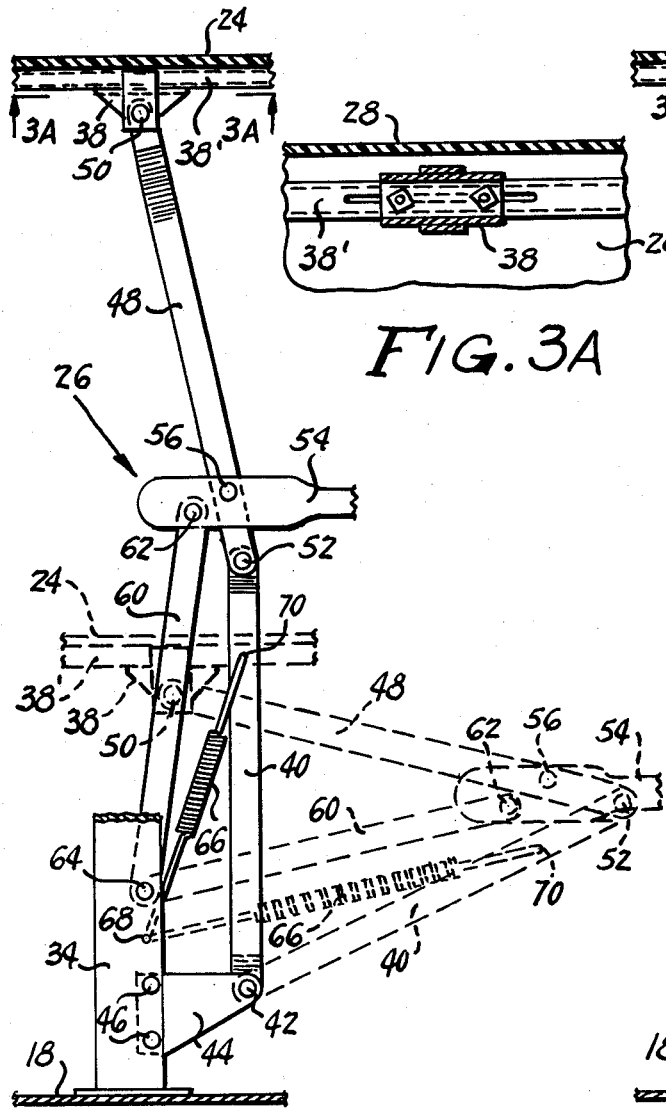
FIG. 3A
FIG. 3
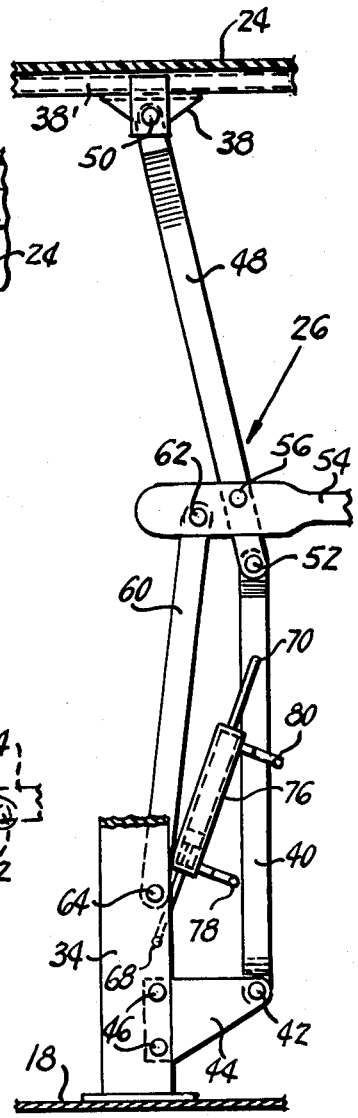
FIG. 4
INVENTOR.
EARNEST C. CRIPE
BY Kimmel & Crowell
ATTORNEYS.

United States Patent Office 3,155,423
Patented Nov. 3, 1964

3,155,423
LIFTABLE VEHICLE TOP
Earnest C. Cripe, Goshen, Ind., assignor to Independent Products Company, Division of the Independent Protection Company, Incorporated, Elkhart, Ind.
Filed Oct. 30, 1962, Ser. No. 234,149
5 Claims. (Cl. 296—100)

This invention relates to a liftable vehicle top and relates more particularly to an extensible and retractable roof element for an otherwise open-top rear portion of a vehicle.

Liftable roof elements for the open portion of a pick-up truck or the like have been proposed heretofore but such prior art devices have always suffered from many serious disadvantages. For example, while it has been known in the past to provide extensible and retractable lifting or supporting arms beneath the roof element, the structural arrangements have always suffered from undue complexities thereby causing frequent mechanical breakdowns and expensive maintenance. Moreover, such devices, due to their intricacy have been particularly expensive to manufacture, rendering them commercially undesirable.

Other prior art structures have been unduly bulky, taking up an excessive amount of the area found in the rear portion of such vehicles both in their extended and retracted positions. This severely limits the amount of storage room remaining thereby defeating the very purpose of such vehicles.

It is, therefore, an object of this invention to provide a liftable vehicle top which is free from the foregoing and other disadvantages.

A further object of this invention is the provision of a device of this character which may be easily installed within an existing rear portion of a vehicle.

Another object of this invention is the provision of a liftable top for a pick-up truck or the like having a plurality of lifting and supporting means which will raise the roof element substantially parallel to the ground and lower the same in a similar manner.

A further object of the instant invention is to provide a device of the character described having means to normally urge the same into its extended position thereby assisting the operator in lifting the roof element.

A still further object of this invention is to provide such a liftable top wherein the same may be raised or lowered by hydraulic or vacuum operated lifting means controlled from a remote position.

An additional object of this invention is the provision of a device of the character described which is simple and inexpensive to manufacture and sturdy and reliable in operation.

Other and further objects reside in the combination of elements, arrangements of parts and features of construction.

Still other objects will in part be obvious and in part be pointed out as the description of the invention proceeds and as is shown in the accompanying drawings where there are disclosed preferred embodiments of this inventive concept.

In the drawings:

FIGURE 3 is an enlarged fragmentary elevational view of one of the forward supporting means in accordance with the instant invention; and FIGURE 4 is an enlarged fragmentary elevational view of a modified form of supporting means.

FIGURE 3A is a fragmentary transverse cross-sectional view taken on line 3A—3A of FIGURE 3 in the direction of the arrows.

Similar reference characters refer to similar parts throughout the several views of the drawings.

Figure 1:
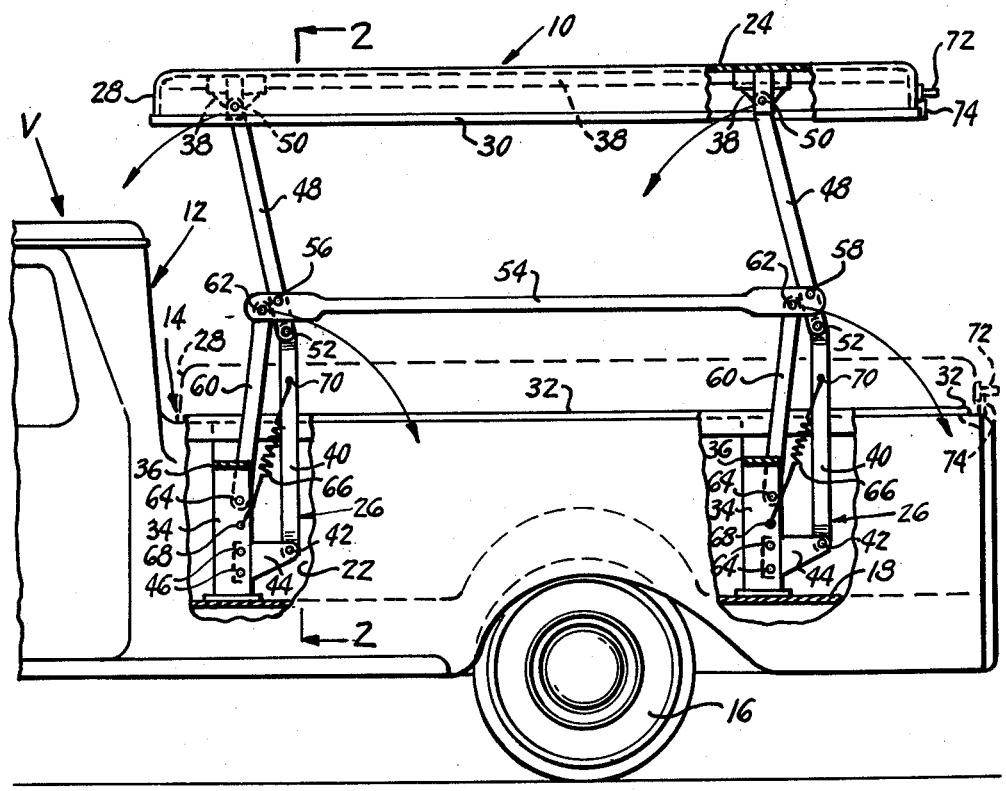
FIGURE 1 is a side elevational view of the device of the instant invention with parts broken away for illustrative clarity.

Referring now to the drawings in detail and particularly to FIGURE 1, the liftable top of the instant invention is indicated generally by the reference numeral 10. A vehicle V having a forward cab portion 12 and a rear open-topped portion 14 is supported in the conventional manner on a plurality of wheels 16, only one being shown for illustrative convenience. The rear portion 14 normally comprises a floor 18 and an upstanding peripheral wall 20 which together define a storage compartment 22. The rear part of the peripheral wall 20 is frequently formed into a hingedly mounted tailgate (not shown) for convenience of access to the storage compartment 22.

The liftable top 10 is comprised of a roof element 24 and a plurality of supporting means indicated generally at 26. The roof element 24 has a downwardly extending peripheral flange portion 28 substantially corresponding in shape to the upstanding peripheral wall 20 of the rear portion 14 of the vehicle V. A small molding 30 on the downwardly extending flange 28 is adapted to overlie an upstanding rim 32 on the peripheral wall 20 when the top 10 is in its retracted position shown by dotted lines in FIGURES 1 and 3. A sealing element (not shown) can be included to effect a water tight seal between these elements when the top 10 is lowered.

The supporting means 26 are each comprised of a bottom mounting plate 34 secured to the floor 18 of the rear portion 14 by nuts and bolts (not shown) or the like. The mounting plate 34 may be offset as at 36 in FIGURE 2 and additionally secured at its top to a portion of the peripheral wall 20. Other suitable bracing may be included if necessary.

For each of the lower mounting plates 34, a corresponding upper mounting plate 38 is fixed to the bottom of the roof element 24 within the downwardly extending flange portion 28. The upper mounting plate 38 may be adjustably secured to a longitudinally extending rail 38' as shown in FIGURE 3A.

A lower supporting arm 40 is pivotally connected at its bottom end 42 to a bracket 44 secured to each lower mounting plate 34 by any conventional means such as generally indicated at 46. An upper supporting arm 48 is pivotally connected at its upper end 50 to each upper mounting plate 38. The lower end of each upper supporting arm 48 and the upper end of each lower supporting arm 40 are pivotally interconnected as at 52.

In order to raise and lower the top 10 in a plane substantially parallel to the ground so that it does not become twisted during this procedure, it is preferable to provide four supporting means 26 mounted in longitudinally aligned pairs on each side of the center line of the pick-up portion 14 of the vehicle V. It is to be noted that only two supporting means 26 are shown in FIGURE 1 for illustrative convenience, but that a transversely aligned pair of supporting means 26 is mounted on the opposite side of the rear portion 14.

A horizontal tie rod 54 is pivotally connected adjacent its ends at 56 and 58 to the upper supporting arms 48 of each pair of longitudinally aligned supporting means 26. The top end of a lifting bar 60 is also pivotally connected adjacent each end of the tie rod 54 as at 62 and is pivotally secured at its lower end to one of the mounting plates 34 as indicated at 64.

Figure 2:
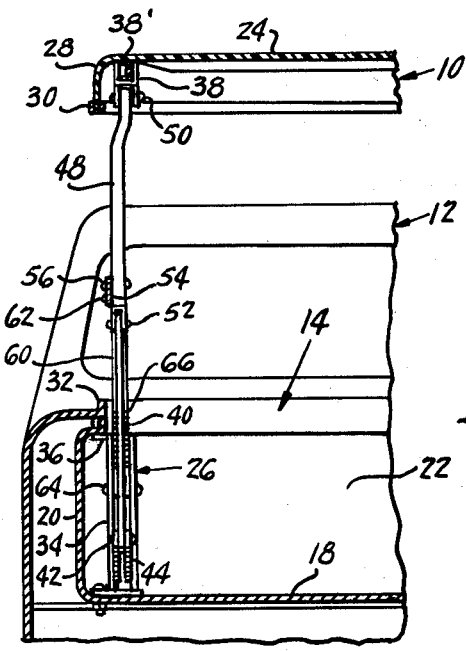
FIGURE 2 is a fragmentary vertical cross-sectional view taken on line 2—2 of FIGURE 1 in the direction of the arrows.

The embodiments of FIGURES 1–3 show a spring means 66 fixed at one end 68 to the mounting plate 34 and at its other end 70 to the lower supporting arm 40 of each supportings means 26. When the supporting means 26 is in its extended position shown in FIGURE 1 and in full lines in FIGURE 3, the spring means 66 is in its position of minimum tension and when the lifting means 26 is in its retracted position as shown in dashed lines in FIGURE 3, the spring means 66 is in its position of maximum tension. Thus, the spring means 66 normally urges the supporting means 26 to its extended position facilitating the lifting of the top 10.

Handles or the like, indicated generally at 72 in FIGURE 1, may be provided on the rear surface of the downwardly extending flange 28 of the roof element 24 to assist in lifting and lowering the same. A latching means 74 of any conventional design may be fixed to the same surface as the handles 72 and may cooperate with means (not shown) on the rear portion 14 of the vehicle V to lock the top 10 in its retracted position as indicated by the dotted lines in FIGURE 1. The latching means 74 will overcome the tendency of each spring means 66 to urge its associated supporting means 26 to its extended position and will hold the roof element 24 in tight contact with the peripheral wall 20 of the rear portion of the vehicle V.

An alternative embodiment of the device of the instant invention is shown in FIGURE 4 wherein all of the elements are exactly the same except that in at least the two forward supporting means 26, the spring means 66 is replaced by a conventional hydraulic or vacuum cylinder 76 which is connected by flexible hoses 78 and 80 to a source of motive power such as the hydraulic or vacuum system of the vehicle V. By a remote control means (not shown), located either on the side of the rear portion 14 or within the cab portion 12 of the vehicle V, the operator may automatically extend the supporting means 26 by means of the cylinder 76 thereby causing the roof element 24 to be lifted without any physical effort.

The use and operation of the device of the instant invention will now be apparent. The latching means 74 will maintain the top 10 in its retracted position shown in dotted lines in FIGURE 1 during normal operation of the vehicle. The upper surface of the roof element 24 may be used to support any desired paraphernalia during operation of the vehicle V. On release of the latching means 74 and a slight upward motion by the operator using the handles 72 or the like, the top 10 will be lifted to the full line position of FIGURES 1 and 3 by the supporting means 26 with the aid of the spring means 66.

The specific arrangement set forth hereinbefore will maintain the roof element 24 in a parallel position throughout its lifting and lowering and will facilitate the operation of the device.

When the top 10 is lifted the storage compartment 22 is available to the operator and may be easily loaded or unloaded. The top 10 may be left in its open position if it is necessary to haul large and bulky items and the supporting means 26 will be maintained in their extended position by the spring means 66. Any other conventional means may be added to releasably lock the supporting means 26 in their extended position for a long haul over particularly bumpy roads.

From the foregoing it will be seen that there is herein provided a device which accomplishes all of the objects of the instant invention and others, including many advantages of great practical utility and commercial importance.

Since many embodiments may be made of this inventive concept and since many modifications may be made in the embodiments herein shown and described, it is to be understood that all matter herein is to be interpreted merely as illustrative, and not in a limiting sense.

I claim:

1. In a vehicle body having a cab portion and a rear open-topped portion with a floor,
an upstanding peripheral wall around said floor defining a storage compartment,
a liftable top over said open-topped portion comprising a roof element having a downwardly extending flange portion substantially corresponding in plan to the shape of said peripheral wall,
spaced apart upstanding lower mounting plates, each mounted upon the floor and also upon the inner face of each longitudinal side wall, a first and second of said plates being longitudinally aligned at one side of the vehicle body, and a third and fourth of said plates being longitudinally aligned at the other side of the vehicle body, said first and third and second and fourth plates being transversely aligned,
longitudinally adjustable upper mounting plates each adjustably fixed to the bottom of said roof element and positioned substantially vertically above a part of each of the said lower mounting plates,
two similar extensible and retractable roof supporting means at the longitudinal sides of the storage compartment, each latter means pivotally connected to said lower mounting plates and said upper mounting plates at a respective side,
said supporting means at each side including a front pair and a rear pair of pivotally connected and vertically collapsible support arms which, in substantially fully extensible position, includes a vertical lower support arm and an upwardly and slightly forwardly inclined upper support arm, thus presenting two arm-axes which form trailing vertex angles with respect to upwardly and forwardly oriented lines passing through the pivot connections of the bottom of the lower support arms and the lower mounting plates and the pivot connection of the top of the upper support arm and the upper mounting plates,
said supporting means at each side including parallel front and rear lifting bars each pivotally connected to a lower mounting plate at a point forward of and above the pivot connection of the bottom of the adjacent lower support arm, the lifting bars in substantially fully extensible position sloping upwardly and slightly rearwardly and terminating at their tops a short distance higher than and in front of the pivot connections between the lower and upper support arms,
said supporting means at each side also including a horizontal tie rod pivotally connected adjacent its ends to the tops of each lifting bar and also pivotally connected to the lower half portions intermediate the ends of each upper support arm at points which are at the intersection of the center lines of the upper support arms and upwardly and backwardly inclined lines passing through the pivots at the tops of the lifting bars,
whereby when the roof supporting means are moved from a fully extensible position to a retractable position corresponding to elevated and lowered roof positions, the tie rods will always remain horizontal due to the said pivot connections with the parallel lifting bars, the tops of the lower support arms will swing arcuately towards the rear of the vehicle body due to the lower arm connections with the lower mounting plate, and the tops of the upper support arms and all points on the roof element will move both downwardly due to the instantaneous height of the tie rods and progressively forwardly of the instantaneous position of the intermediate portion pivot of the upper support arm and tie rod, thus keeping the roof horizontal in all positions of closure, and moving all points on the roof substantially straight downwardly but slightly rearwardly.

2. The structure of claim 1 wherein contractable means are pivotally attached between an upper portion of the lower support arms and points on the lower mounting plates which are forward of the pivot connections of the lower ends of the support arms and intermediate in height between the latter pivot connections and the pivot connections of the lower ends of the lifting bars with the lower mounting plate, whereby upon contraction of said means the lower supporting arms, and consequently all points on the roof element are urged towards more extended positions.

3. The structure of claim 2 wherein said contractable means includes a fluid cylinder pivotally attached between each of the lower support arms and its corresponding lower mounting plate, and a source of motive power operated by remote means is connected to the cylinders.

4. The structure of claim 2 wherein the two of the contractable means which are connected to the two forward lower support arms include a fluid cylinder and control means therefor, and the two contractable means connected to the two rear lower support arms includes spring means.

5. The structure of claim 2 wherein said contractable means includes spring means attached between each of the lower support arms and its corresponding lower mounting plate.

References Cited in the file of this patent

UNITED STATES PATENTS

| | | |
|---|---|---|
| 1,871,871 | Woods | Aug. 16, 1932 |
| 2,531,140 | Linde | Nov. 21, 1950 |
| 2,930,651 | Lautenbach et al. | Mar. 29, 1960 |
| 3,083,047 | Babbel | Mar. 26, 1963 |

FOREIGN PATENTS

| | | |
|---|---|---|
| 255,980 | Great Britain | Aug. 5, 1926 |
| 586,759 | Italy | Dec. 20, 1958 |